(12) United States Patent
Moqvist

(10) Patent No.: US 8,842,641 B2
(45) Date of Patent: Sep. 23, 2014

(54) RAKE RESOURCE MULTIPLEXING FOR ENHANCED UPLINK DATA SERVICES

(75) Inventor: Pär Moqvist, Lerum (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 215 days.

(21) Appl. No.: 13/208,413

(22) Filed: Aug. 12, 2011

(65) Prior Publication Data

US 2013/0039347 A1 Feb. 14, 2013

(51) Int. Cl.
 *H04W 52/02* (2009.01)
 *H04L 1/18* (2006.01)
 *H04W 72/12* (2009.01)
 *H04W 76/04* (2009.01)

(52) U.S. Cl.
 CPC ......... *H04W 72/1268* (2013.01); *H04L 1/1822* (2013.01); *H04W 76/048* (2013.01)
 USPC ....................................................... 370/335

(58) Field of Classification Search
 CPC ..................... H04B 1/707; H04B 2201/70701; H04B 7/2628; H04J 13/00; H04J 13/16
 USPC ....................................................... 370/329
 See application file for complete search history.

(56) References Cited

U.S. PATENT DOCUMENTS

| | | | |
|---|---|---|---|
| 5,239,557 A * | 8/1993 | Dent | 370/342 |
| 5,430,760 A * | 7/1995 | Dent | 375/144 |
| 5,553,095 A * | 9/1996 | Engdahl et al. | 375/222 |
| 6,512,750 B1 * | 1/2003 | Palenius | 370/318 |
| 7,230,932 B2 * | 6/2007 | Numminen | 370/311 |
| 7,586,949 B1 * | 9/2009 | Barany et al. | 370/474 |
| 7,929,467 B2 * | 4/2011 | Mottier | 370/280 |
| 8,045,936 B2 * | 10/2011 | Wu et al. | 455/91 |
| 8,060,130 B2 * | 11/2011 | Gholmieh et al. | 455/522 |
| 8,098,623 B2 * | 1/2012 | Ramesh et al. | 370/329 |
| 8,098,635 B2 * | 1/2012 | Montojo et al. | 370/335 |
| 8,149,749 B2 * | 4/2012 | Maeda et al. | 370/311 |
| 8,295,217 B2 * | 10/2012 | Kone et al. | 370/311 |
| 8,358,614 B2 * | 1/2013 | Pani et al. | 370/328 |
| 8,406,172 B2 * | 3/2013 | Barany et al. | 370/328 |
| 8,412,209 B2 * | 4/2013 | Whinnett et al. | 455/450 |
| 8,498,228 B2 * | 7/2013 | Lee et al. | 370/310 |
| 2005/0281217 A1 * | 12/2005 | Mottier | 370/328 |
| 2007/0109995 A1 * | 5/2007 | Quigley et al. | 370/329 |

(Continued)

FOREIGN PATENT DOCUMENTS

| | | | | |
|---|---|---|---|---|
| EP | 1643694 | * | 5/2006 | ............. H04L 12/56 |
| WO | 2007025138 A2 | | 3/2007 | |
| WO | 2008132650 A2 | | 11/2008 | |

OTHER PUBLICATIONS

3GPP TS 36.212 ver. 10.0.0 Release 10, pp. 33-34 (Jan. 2011).*

(Continued)

*Primary Examiner* — Mark Rinehart
*Assistant Examiner* — Peter Solinsky
(74) *Attorney, Agent, or Firm* — Coats & Bennett, P.L.L.C.

(57) ABSTRACT

A receiver resource administrator coordinates uplink transmissions from a mobile terminal in order to reduce the RAKE resources required to support the mobile terminal and to provide greater predictability in the uplink transmissions. The reduction of RAKE resources and the increased predictability of the uplink transmissions enable multiplexing of multiple mobile terminals using the same RAKE resources.

24 Claims, 5 Drawing Sheets

(56) References Cited

U.S. PATENT DOCUMENTS

| | | | |
|---|---|---|---|
| 2009/0010198 A1* | 1/2009 | Boariu et al. | 370/315 |
| 2009/0296643 A1* | 12/2009 | Cave et al. | 370/329 |
| 2010/0157953 A1 | 6/2010 | Christoffersson et al. | |
| 2010/0246499 A1* | 9/2010 | Kim et al. | 370/329 |
| 2010/0260121 A1* | 10/2010 | Gholmieh et al. | 370/329 |
| 2011/0103315 A1* | 5/2011 | Camp et al. | 370/329 |
| 2011/0170420 A1* | 7/2011 | Xi et al. | 370/241 |
| 2012/0002619 A1* | 1/2012 | Kim et al. | 370/329 |
| 2012/0014296 A1* | 1/2012 | Sung et al. | 370/280 |
| 2012/0082079 A1* | 4/2012 | Luo et al. | 370/311 |
| 2012/0113825 A1* | 5/2012 | Baglin et al. | 370/252 |
| 2012/0170485 A1* | 7/2012 | Maeda et al. | 370/252 |
| 2012/0207040 A1* | 8/2012 | Comsa et al. | 370/252 |
| 2012/0224548 A1* | 9/2012 | Marinier et al. | 370/329 |
| 2013/0010625 A1* | 1/2013 | Schein | 370/252 |
| 2013/0121179 A1* | 5/2013 | Dang et al. | 370/252 |
| 2013/0294372 A1* | 11/2013 | Ishii et al. | 370/329 |
| 2013/0336254 A1* | 12/2013 | Imamura et al. | 370/329 |
| 2013/0343260 A1* | 12/2013 | Seo et al. | 370/315 |
| 2013/0343329 A1* | 12/2013 | Papasakellariou et al. | 370/329 |
| 2014/0003400 A1* | 1/2014 | Lim et al. | 370/336 |

OTHER PUBLICATIONS

3GPP TS 25.214 v 10.2.0 (Apr. 2011).*
3GPP TS 32.407 ver. 10.0.0 p. 15 (Sep. 2010).*
3GPP TSG-RAN #26, Tdoc RP-040527, (Jan. 2004).*
3GPP TSG-RAN WG1 Change Request TS25.212 CR 195, Nov. 2004.*
3GPP TS 25.319 ver. 7.7.0, Release 7, Jun. 2009.*
3rd Generation Partnership Project, "Technical Specification Group Radio Access Network; Physical channels and mapping of transport channels onto physical channels (FDD) (Release 10)", Technical Specification, 3GPP TS 25.211 V10.0.0, Sep. 1, 2010, pp. 1-58, 3GPP, France.
3rd Generation Partnership Project, "Technical Specification Group Radio Access Network; Physical layer procedures (FDD) (Release 10)", Technical Specification, 3GPP TS 25.214 V10.2.0, Mar. 1, 2011, pp. 1-100, 3GPP, France.
3rd Generation Partnership Project, "Technical Specification Group Radio Access Network; Medium Access Control (MAC) protocol specification (Release 10)", Technical Specification, 3GPP TS 25.321 V10.2.0, Mar. 1, 2011, pp. 1-198, 3GPP, France.
3rd Generation Partnership Project, "Technical Specification Group Radio Access Network; UTRAN Iub interface Node B Application Part (NBAP) signalling (Release 10)", Technical Specification,3GPP TS 25.433 V10.2.0, Mar. 1, 2011, pp. 1-1290, 3GPP, France.
3rd Generation Partnership Project, "Technical Specification Group Radio Access Network; Radio Resource Control (RRC); Protocol specification (Release 10)", Technical Specification, 3GPP TS 25.331 V10.3.1, Apr. 1, 2011, pp. 1-1863, 3GPP, France.

* cited by examiner

RAKE RESOURCE MULTIPLEXING FOR ENHANCED UPLINK DATA SERVICES

BACKGROUND

The present inventions relate generally to enhanced uplink data services for wireless networks and, more particularly, to receiver resource multiplexing for enhanced uplink data services.

In mobile communication systems, packet data services are becoming increasingly popular. In the High Speed Packet Access (HSPA) technology for Wideband Code Division Multiple Access (WCDMA) systems, packet data is supported through the High Speed Downlink Packet Access (HSDPA) and the Enhanced Uplink (EUL). The traffic patterns of packet data can vary considerably, ranging from full-buffer (e.g., file upload) data streams to bursty data with relatively low average data rates. A key design parameter is therefore to handle both these extremes efficiently. The full buffer pattern requires efficient resource utilization during data transfers. The bursty data pattern requires the system to respond quickly to data bursts, while minimizing the resource overhead during inactive periods. The resource overhead is typically of two kinds, the load on the air interface and the system resources in the Node B, also known as a base station. In the uplink, a major system resource is the RAKE receiver processing resources.

Using the Enhanced Dedicated Channel (E-DCH) introduced with EUL, there are typically four physical channels transmitted over the air interface for each mobile terminal. The Dedicated Physical Control Channel (DPCCH) is used for synchronization and power control. The Enhanced Dedicated Physical Data Channel (E-DPDCH) is the uplink channel used to transmit user data from the mobile terminal to the Node B. The Enhanced Dedicated Physical Control Channel (E-DPCCH) carries control information necessary to enable the Node B to demodulate and decode the E-DPDCH. The High Speed Dedicated Physical Control Channel is used to transmit control information for the HSDPA.

In order to increase system capacity, the uplink transmissions on these channels can be reduced. However, in order to also save RAKE receiver resources at the Node B, the reductions must be done in an intelligent manner so that a scheduler at the Node B can determine when to expect the uplink transmissions.

SUMMARY

The present invention provides methods and apparatus to coordinate uplink transmissions from a mobile terminal in order to reduce the receiver resources required to support the mobile terminal and to provide greater regularity in the uplink transmissions. The reduction of receiver resources and the increased regularity of the uplink transmissions enables multiplexing of multiple mobile terminals using the same receiver resources. The invention may be used for example in conjunction with a RAKE receiver to reduce RAKE receiver resources required to support the mobile terminal.

Exemplary embodiments of the invention comprise methods of allocating receiver resources at a base station to receive uplink transmissions from a wireless terminal, also referred to herein as a mobile terminal, operating in a discontinuous transmission mode. In one exemplary method, an acknowledgement process is selected for the wireless terminal for uplink transmissions. Control parameters are determined for the discontinuous transmission mode to align an uplink burst cycle for transmissions on a dedicated control channel with the selected acknowledgement process. Receiver resources are then allocated to the wireless terminal based on the selected acknowledgement process and uplink burst cycle.

Other embodiments of the invention comprise a system for allocating receiver resources at a base station to receive uplink transmissions from a wireless terminal operating in a discontinuous transmission mode. In one exemplary embodiment, the system comprises a radio resource manager and a scheduler, which may be located at the same node or at different nodes in the network. The radio resource manager allocates radio resource to a wireless terminal for uplink transmissions. The radio resource manager is configured to select an acknowledgement process for the wireless terminal for uplink transmissions, and to determine control parameters for the discontinuous transmission mode to align an uplink burst cycle for transmissions on a dedicated control channel with the selected acknowledgement process. The scheduler schedules uplink transmissions from the mobile terminal to the base station. The scheduler is configured to allocate receiver resources to the wireless terminal based on the selected acknowledgement process and uplink burst cycle.

The alignment of the uplink burst cycles with the allocated acknowledgement process reduces the receiver resources (e.g. RAKE resources) required to support the mobile terminal. Also, the coordination of the uplink transmissions over multiple channels results in a more predictable transmission pattern. The reduction in the receiver resources, along with more predictable transmission patterns, enables multiplexing of multiple mobile terminals on the same receiver resources, and thus increases system capacity without using additional resources.

DETAILED DESCRIPTION

Figure 1:
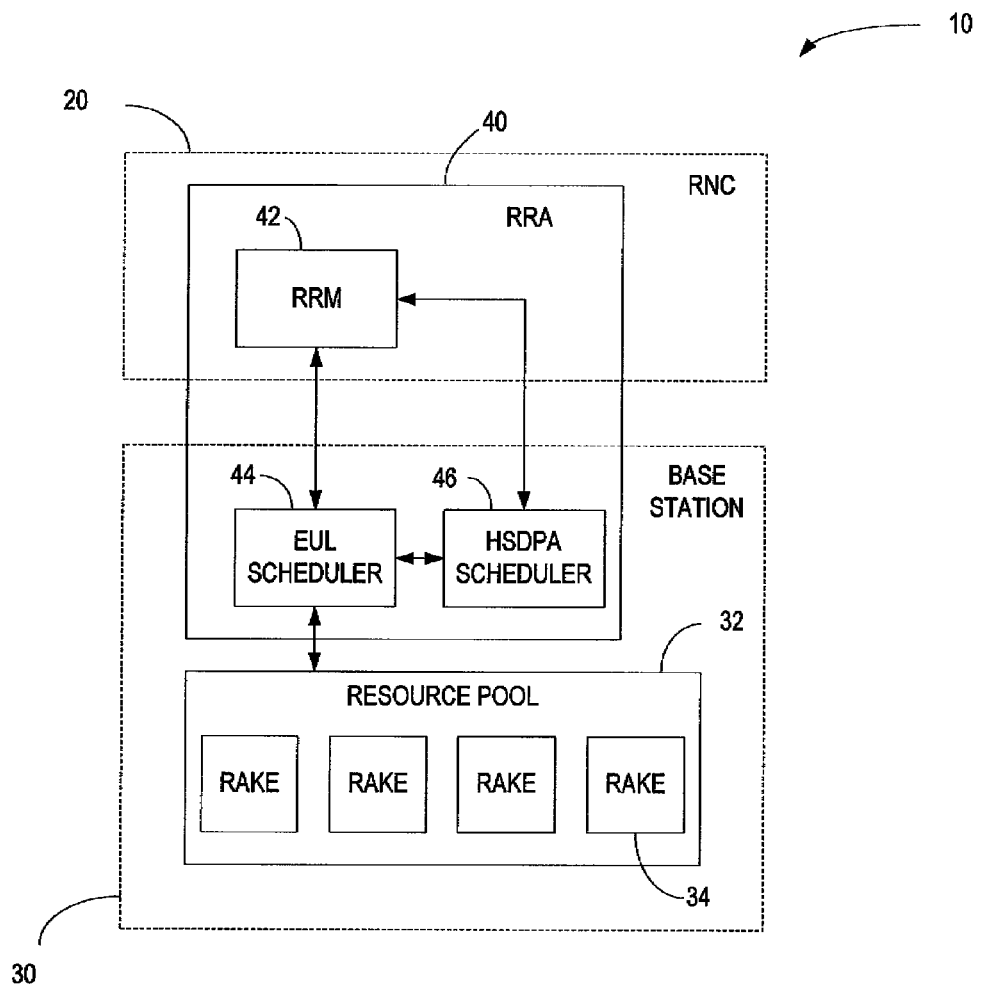
FIG. 1 illustrates an exemplary communication network including a RAKE resource administrator.

Referring now to the drawings, exemplary embodiments of the present invention will be described in the context of a RAKE receiver for a Wideband Code Division Multiple Access (WCDMA) system. Those skilled in the art will appreciate that the invention is not restricted to use in WCDMA system, but instead is applicable to other mobile communication systems providing high speed packet services on the uplink. For example, the present invention could be applied in Long Term Evolution (LTE) networks, Worldwide Interoperability for Microwave Access (WiMAX) networks, and Wireless Local Area Networks (WLANs) based on the 802.11 family of standards. Also, those skilled in the art will appreciate that the present invention is generally applicable to all receiver types and not solely applicable to RAKE receivers.

EUL in WCDMA provides high speed uplink access to the mobile terminals served within the network. The mobile terminals transmit data to one or more base stations on a transport channel, referred to as the Enhanced Dedicated Channel (E-DCH). As the name implies, the E-DCH is a dedicated channel. The E-DCH is mapped to a set of channelization codes known as E-DCH Dedicated Physical Data Channels (E-DPDCHs). At any given time, a mobile terminal may transmit on one or more E-DPDCHs. Depending on the instantaneous data rate, the number of E-DPDCHs and their spreading factors may vary.

A scheduler at the base station coordinates transmissions by the mobile terminals on the uplink. The mobile terminals report buffer levels, power headroom, QoS requirements, and other scheduling information to the base station in a scheduling request. Based on the instantaneous interferences levels at the base station and the scheduling information received from the mobile terminals, the base station determines which mobile terminals are allowed to transmit and at what rates. The base station transmits scheduling grants to the scheduled mobile terminals to indicate when and at what rate the mobile terminals are allowed to transmit. The scheduling grant typically specifies a ratio of E-DPDCH-to-pilot power ratio allowed for the scheduled mobile terminal, and the mobile terminal is allowed to select any transport block size (data rate) so long as the specified power ratio is not exceeded. In general, a higher power ratio corresponds with a higher data rate.

The WCDMA standard includes a number of channels to support EUL. These channels include the E-DCH Dedicated Physical Control Channel (E-DPCCH), the E-DCH Absolute Grant Channel (E-AGCH), the E-DCH Relative Grant Channel (E-RGCH), and the E-DCH Hybrid ARQ Indicator Channel (E-HICH). The E-DPCCH is an uplink control channel used by the mobile terminal to transmit control information (e.g., scheduling requests) for the EUL. The E-AGCH and E-RGCH are downlink control channels used by the serving base station in a cell to transmit scheduling grants. The E-AGCH is typically used to transmit absolute grants for large changes in the data rate and the E-RGCH is typically used for smaller rate adjustments during ongoing data transmissions. The E-HICH is another downlink control channel used to acknowledge uplink transmissions from mobile terminals on the E-DCH.

Mobile terminals configured to support EUL typically transmit data on four physical channels in the uplink. These channels include the E-DPDCH, which carries user data, and the E-DPCCH which carries control information. In addition, the mobile terminals transmits a pilot signal on the Dedicated Physical Control Channel (DPCCH), which is used at the base station for channel estimation in order to perform coherent demodulation. A mobile terminal supporting EUL is also likely to support High Speed Downlink Packet Access (HS-DPA). The mobile terminal is therefore likely to transmit data on the High Speed Dedicated Physical Control Channel (HS-DPCCH) to ACK or NACK downlink transmissions from the base station and to send Channel Quality Indicator (CQI) reports to the base station.

In order to gain air interface load the transmissions on these control channels must be reduced. The E-DPCCH is transmitted only when the E-DPDCH data channel is transmitted. However, the DPCCH is transmitted continuously to maintain uplink synchronization and power control. Moreover, the HS-DPCCH is transmitted whenever there is a need to ACK or NACK a downlink transmission or to send CQI information. An ACK is only transmitted by mobile terminals receiving data in the downlink, while a CQI is typically transmitted by all mobile terminals, but only once every CQI feedback cycle to lower the air interface load.

Continuous packet connectivity (CPC) may also be implemented to improve overhead load. With CPC enabled, the mobile terminal inhibits the transmission of the DPCCH during periods of data inactivity. More specifically, after a certain time of inactivity, the mobile terminal will enter a discontinuous transmission (DTX) cycle during which it transmits control channels only for a short period (the DPCCH burst) in each cycle, which is enough to maintain synchronization and power control. This intermittent transmission will lower the air interface load substantially compared to continuous DPCCH transmission.

With CPC it is also possible to adapt the CQI transmissions to the DPCCH DTX cycle. After a period of downlink inactivity, which is indicated by the CQI DTX timer, the CQI transmissions are inhibited unless they coincide with the DPCCH burst. The mobile terminal will still transmit ACK if it receives data in the downlink. Thus, the mobile terminal may still transmit data not coinciding with the DPCCH burst.

CPC also allows configuration of a Medium Access Control (MAC) DTX, which controls the data transmissions on E-DPDCH and the related E-DPCCH. If data activity is detected during a MAC DTX cycle, the mobile terminal waits until the start of the next cycle before the data is transmitted. Together with DPCCH DTX and CQI DTX, MAC DTX can lower the overhead load.

The reduction in overhead load provides opportunities to use the RAKE resources at the base station more efficiently by switching off or reassigning RAKE resources during the DPCCH DTX and MAC DTX cycles. The reduction in RAKE resource utilization depends on the sparseness of the DPCCH DTX, MAC DTX, and CQI feedback cycles, as well as the MAC DTX inactivity threshold and the CQI DTX timer. These configuration parameters must be set to meet certain synchronization/power control performance, uplink data transfer latency, and downlink link adaptation performance. They can possibly be optimized towards specific traffic patterns. However, in order to also save receiver resources, such as RAKE resources, the reductions must be done according to a deterministic pattern, the knowledge of which can be utilized in the base station.

In addition to CPC, process grants for the Hybrid Automatic Repeat Request (HARQ) can be used to reduce overhead requirements for uplink transmissions. Scheduling for the EUL is based on 2 ms transmission time intervals (TTIs). Data is transmitted on the uplink in 2 ms subframes using 8 HARQ processes. The HARQ processes are herein referred to generically as acknowledgement processes. The serving base station sends each scheduled mobile terminal a scheduling grant, which limits the transmitted data amount per subframe (e.g., the data rate). The mobile terminal can also transmit-non-scheduled information, such as signaling radio bearer (SRB) control messages, up to some maximum (but typically much lower) rate. Additionally, the mobile terminal can also send status updates, e.g., scheduling information (SI), to the system. The SRB messages and SI can be multiplexed with the scheduled data in the same subframe.

Without optional features, the minimum data rate for EUL is rather high—around 160 kbps. This high data rate is associated with a high resource cost and is ill suited for bursty traffic patterns typical in the uplink. However, the scheduling grant can be given for a specific subset of HARQ processes. This way, the mobile terminal must not transmit scheduled data outside of the granted HARQ processes. CPC-enabled terminals will first consider the MAC DTX cycle and then the next granted HARQ process before data transmission.

With a single HARQ process grant (1 out of 8 HARQ processes), a mobile terminal can transmit at an average data rate of 20 kbps. In bursty packet data scenarios, this rate is sufficient most of the time. If the mobile terminal requests a higher data rate, it can be granted additional HARQ processes and/or higher data rate per HARQ process.

In a similar way, non-scheduled data can be granted a specific (and different) data rate and subset of HARQ processes by the Radio Network Controller (RNC). In this case, the data transfer latency is particularly important to consider. The non-scheduled grant requires particular attention because it may affect the SRB detection performance, which relates to system coverage and dropped call performance.

In scenarios with many bursty packet data users, it is important from a system resource perspective to maximize the number of connected mobile terminals, considering both air interface load and the receiver resources. Greater efficiency in RAKE resource utilization can be achieved if the uplink transmissions are controlled in a way that allows multiplexing of many mobile terminals onto the same RAKE resource.

In exemplary embodiments of the present invention, a RAKE Resource administrator (RRA) coordinates uplink transmissions from a mobile terminal to minimize or reduce use of RAKE resources by the mobile terminal. The RRA allows multiplexing of multiple mobile terminals on the same RAKE resources by coordinating uplink transmissions so that they do not overlap in time. Multiplexing allows the number of mobile terminals sharing the same RAKE resources to exceed the number of simultaneous DPCCHs that can be received by the base station on those resources.

FIG. 1 illustrates one exemplary embodiment of the RRA, indicated generally by the numeral 40, adapted for a WCDMA network 10. The network 10 comprises a radio network controller (RNC) 20 and base station 30, which is also known as an NodeB. Base station 30 communicates with the mobile terminals over the air interface and RNC 20 manages the radio resources used by the base station 30. The base station 30 schedules transmissions to and from the mobile terminals. Base station 30 includes a plurality of RAKE resources 34, which may be put in a resource pool 32, to receive uplink transmissions from the mobile terminals. The function of the RRA 40 is to reduce or minimize the amount of RAKE resources 32 used by a mobile terminal and to coordinate uplink transmissions to enable multiplexing of multiple mobile terminals on the same RAKE resource. The functional components of the RRA 40 are distributed between the RNC 20 and base station 30. More particularly, the functions of the RRA 40 are performed by the Radio Resource Manager (RRM) 42 in the RNC 20, the EUL scheduler 44 in the base station, and the HSDPA scheduler 46 in the base station 30. The EUL scheduler 44 is also referred to herein generically as the uplink scheduler 44. The HSDPA scheduler 46 is referred to herein generically as the downlink scheduler 46.

The RRA 40 can use a number of strategies to minimize or reduce uplink transmissions from the mobile terminal. These strategies include:

Restrict scheduled data transmissions to one or a few HARQ processes.

Restrict non-scheduled data transmissions to one or a few HARQ processes.

Restrict multiplexing of scheduled and non-scheduled data in the same subframe.

Align the CQI feedback cycle with the HARQ process allocation.

Use specific CPC parameters to align the DPCCH DTX and the MAC DTX cycles with the HARQ process allocation, such that the DPCCH DTX cycle enables robust synchronization and power control performance at minimum resource overhead, and such that the MAC DTX cycle provides a low access latency for uplink data transfers.

Restrict SI transmissions by setting the MAC inactivity threshold to 1 and configuring the SI with periodic triggering.

In non-serving cells, configure the RAKE resource to discard data received at a higher rate than allocated.

Use a common RAKE resource pool for HS-DPCCH transmissions during downlink data activity, managed using HSDPA scheduling decisions.

These strategies can be used to restrict the majority of uplink transmissions to a specific time window, making uplink transmissions more predictable so that multiple mobile terminals can be multiplexed on the same RAKE resources. During radio bearer setup, the RRA 40 evaluates the RAKE resource pool occupancy, and assigns HARQ processes, CPC parameters, and CQI feedback cycle to the mobile terminal. The RRA 40 also selects a RAKE resource pool 32 and allocates a RAKE resource 34 in that pool.

Figure 2:
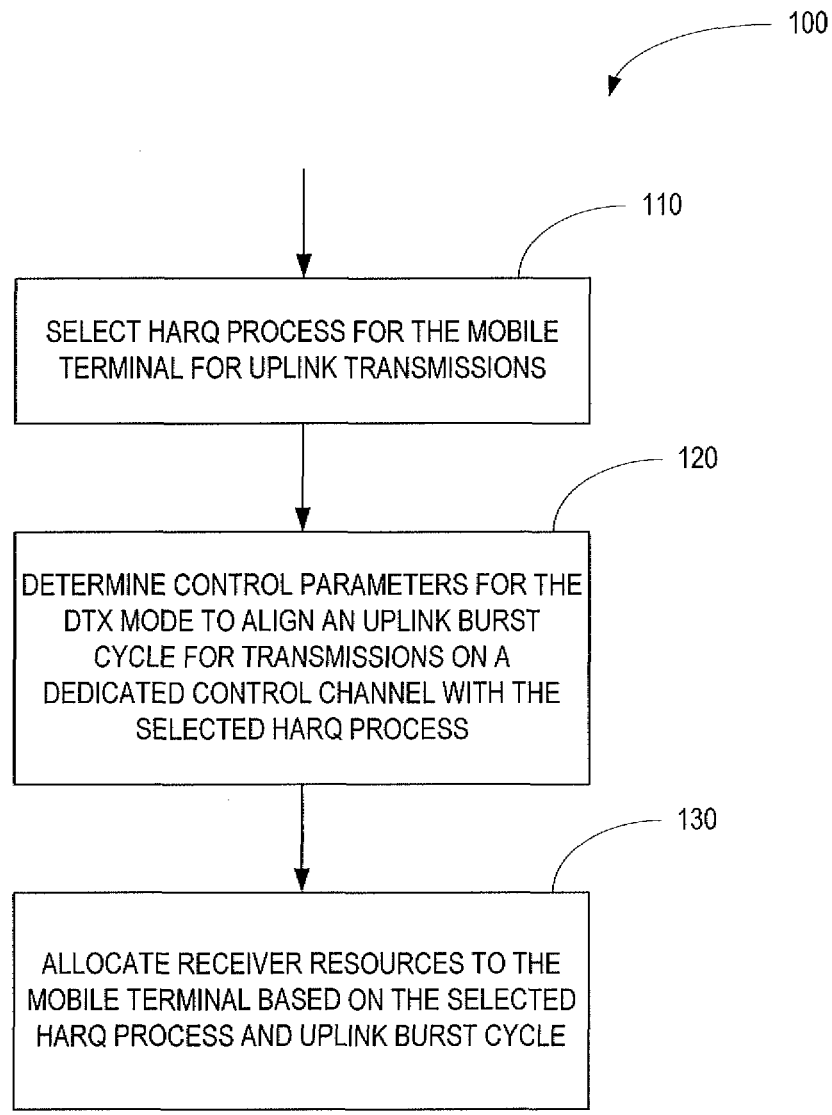
FIG. 2 illustrates an exemplary procedure for allocating receiver resources.

FIG. 2 illustrates an exemplary method 100 according to one embodiment. The method 100 may be performed during radio bearer setup for the mobile terminal, or when the radio bearer is reconfigured. The RRA 40 begins by selecting a HARQ process for the mobile terminal for non-scheduled data transmissions (block 110). The selection of the HARQ process is performed by the RRM 42. One or more HARQ processes may be selected. RRM 42 configures CPC parameters for a discontinuous transmission (DTX) mode to align uplink burst cycles for transmission on dedicated control channels (e.g., DPCCH and E-DPCCH) with the selected HARQ process (block 120). In one exemplary embodiment, the RRM 42 aligns both a DPCCH DTX burst cycle and a MAC DTX burst cycle with the selected HARQ process or processes. The DPCCH DTX burst cycle controls the timing of transmissions on the DPCCH. The MAC DTX burst cycle controls the timing of transmissions on the E-DPCCH and the E-DPDCH. In some embodiments, the RRM 42 may also configure a CQI feedback cycle, set the MAC inactivity timer and configure SI reporting to minimize SI transmissions outside the period of the allocated HARQ process or processes, select the maximum packet size for non-scheduled data transmissions, and prohibit multiplexing of scheduled and non-scheduled data in the same subframe. The RRM 42 signals the selected HARQ process or processes and the CPC parameters to the base station 30 in a radio link setup message. The uplink scheduler 44 at the base station determines resource availability and allocates RAKE resources based on the selected HARQ process and uplink burst cycle (block 130).

Figure 3:
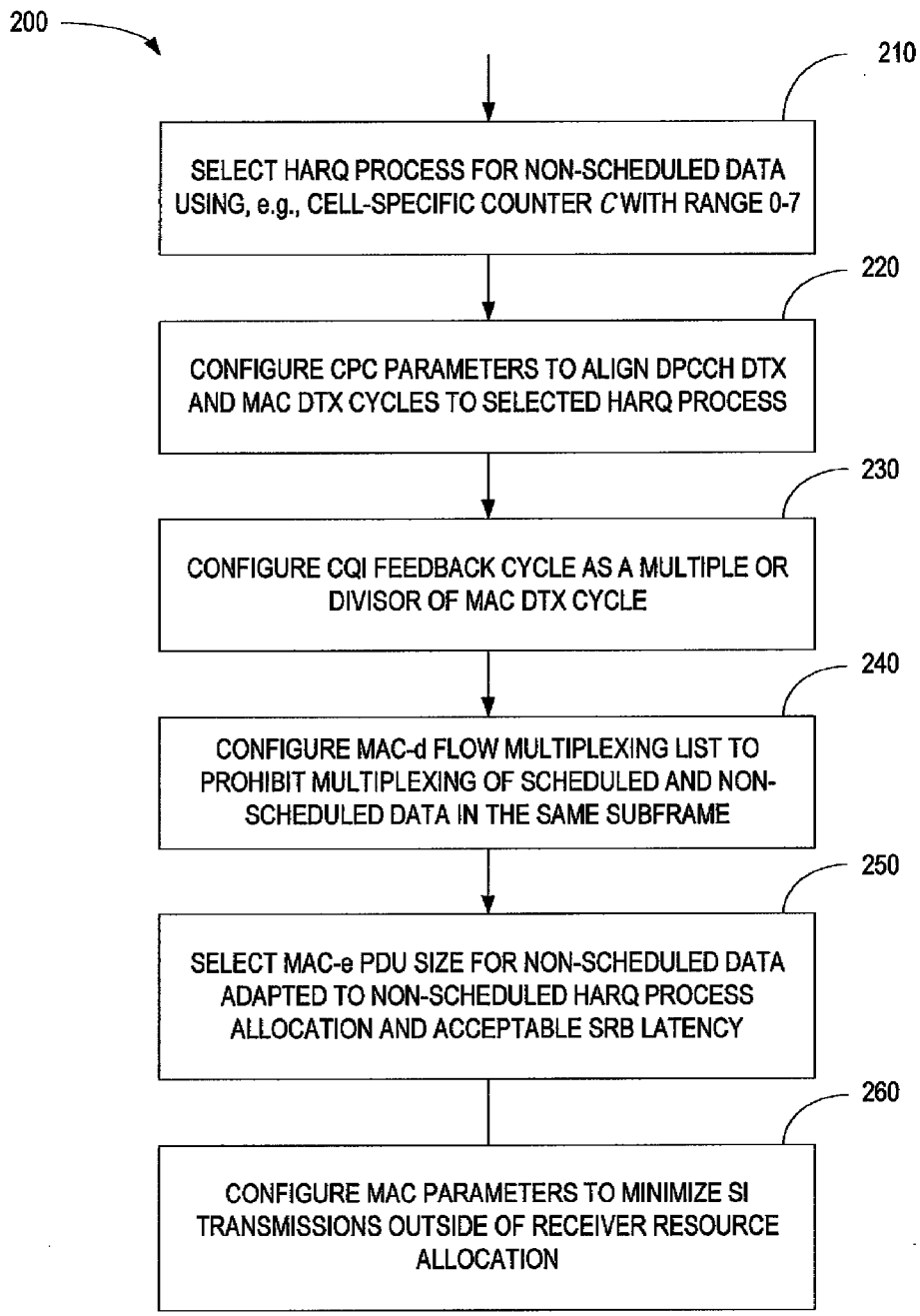
FIG. 3 illustrates an exemplary procedure implemented by a radio resource manager for selecting a HARQ process and determining configuration parameters for a radio bearer.

FIG. 3 illustrates an exemplary procedure 200 performed by the RRM 42 according to one embodiment adapted for use in a WCDMA system. The procedure 200 shown in FIG. 3 is performed during radio bearer setup. RRM 42 selects an HARQ process for non-scheduled data transmissions (block 210). Currently, the WCDMA standard supports 8 HARQ processes designated 0-7. In one exemplary embodiment, the RRM 42 uses a cell-specific counter C with range 0-7 to select the HARQ process, which is incremented after each radio bearer setup. The RRM 42 maps the current counter value to an HARQ process using the FRAME OFFSET and CHIP OFFSET information elements in the NodeB Application Protocol (NBAP), as shown in Table 1 Assuming a 2 ms transmission time interval (TTI), the mobile terminals are distributed over a 16 ms period.

TABLE 1

HARQ Process

| Parameter | Rule | Example |
|---|---|---|
| HARQ process allocation for 2 ms TTI | Equal to (C + 5*Frame Offset − round(Chip Offset/7680)) MOD 8 | 7 |

After the HARQ process is selected, the RRM 42 configures CPC parameters in order to align the DPCCH DTX burst cycle and MAC DTX burst cycle to the HARQ process allocation (block 220). Table 2 below shows CPC parameters for aligning the DPCCH DTX burst cycle and MAC DTX burst cycle with HARQ process 7.

TABLE 2

DPCCH DTX and MAC DTX Burst Cycles

| Parameter | Rule | Example |
|---|---|---|
| UE DTX DRX Offset | Equal to HARQ process no. | 7 |
| UE DTX cycle 1 | Multiple of 8 subframes | 16 |
| UE DPCCH burst_1 | 1 or 2 subframes | 2 |
| UE DTX cycle 2 | Multiple of 8 subframes | 16 |
| UE DPCCH burst_2 | 1 or 2 subframes | 2 |
| MAC DTX cycle | 8 subframes | 8 |
| Enabling Delay | 0 radio frames | 0 |

After the DPCCH DTX and MAC DTX burst cycles are configured, RRM 42 configures the CQI feedback to be a multiple or divisor of the MAC DTX cycle (block 230). Configuration of the Chip Offset is optional. The effective CQI feedback cycle in absence of downlink activity will be at least 16 ms. It may also improve the alignment of the CQI feedback cycle with the MAC DTX cycle by setting the Chip Offset variable. Table 3 shows CPC parameters to align the CQI feedback cycle with the MAC DTX cycle.

TABLE 3

CQI Feedback Cycle

| Parameter | Rule | Example |
|---|---|---|
| CQI Feedback cycle, k | 2, 4, 8, 16, 32, or 64 ms | 8 ms |
| Chip Offset | Chip Offset = (7680*n − 1024)MOD 38400 where n = 0, 1, . . . , 4 | 14336 chips |
| Note: Optional settting | | |

In the embodiment shown in FIG. 3, the RRM 42 prohibits multiplexing of scheduled and non-scheduled data in the same subframe by configuring the MAC-d multiplexing list as shown in Table 4 (block 240).

TABLE 4

MAC-d Multiplexing List

| Parameter | Rule | Example |
|---|---|---|
| E-DCH MAC-d flow multiplexing list | No multiplexing of scheduled and non-scheduled MAC-d flows | 00000000 |

RRM 42 then selects a maximum MAC-e packet data unit (PDU) size for non-scheduled data (block 250). The MAC-e PDU size is adapted to the non-scheduled HARQ process allocation and acceptable SRB latency. For example, the MAC-e PDU size shown in Table 5 is large enough for three 144-bit MAC-d PDUs plus 18 bits SI.

TABLE 5

MAC-E PDU Size

| Parameter | Rule | Example |
|---|---|---|
| Max MAC-e PDU contents size | — | 450 bits |

Finally, the RRM 42 may configure parameters, e.g., inactivity threshold and periodicity of SI transmissions, in order to minimize SI transmissions outside of the HARQ process allocation (block 260). As shown in Table 6, the MAC inactivity threshold is set to 1 subframe. The effective periodicity of SI transmissions, considering the 16 ms MAC DTX cycle, will be 16 ms, 80 ms, or 400 ms. Periodic SI transmissions ensure that SI is received in case of HARQ failure due to SI transmission outside of RAKE resource allocation.

TABLE 6

SI Transmission

| Parameter | Rule | Example |
|---|---|---|
| MAC Inactivity Threshold | 1 subframe | 1 |
| Periodicity for Scheduling Info - grant | 4 ms (16 ms effective periodicity) 10 ms (80 ms effective periodicity) 100 ms (400 ms effective periodicity) | 10 ms |

The parameters listed in Tables 1-6 are sent to the base station 30 in one or more radio link setup messages. When the base station 30 receives the radio link setup messages, the uplink scheduler 44 allocates RAKE resources 34 corresponding to the data rate and extent of the required RAKE processing for the mobile terminal. The required data rate for scheduled data in the allocated HARQ process is the minimum rate able to bear one scheduled MAC-d flow PDU plus SI, typically 336+18=354 bits. However, if the non-scheduled data plus SI is larger, e.g., 450 bits, this will determine the rate allocation in the RAKE processing.

In non-serving cells, the uplink scheduler 44 configures the RAKE resource pool 32 to discard data received at a higher rate than allocated. In the non-serving cells, the RAKE resource allocation may not have adapted to an increase of the scheduling grant performed by the serving cell. Thus, with an allocation corresponding to the non-scheduled data plus SI (e.g. averaging 27 kbps), the SRB will be protected even if the scheduled data exceeds this level and/or if it is allocated more HARQ processes.

Figure 4:
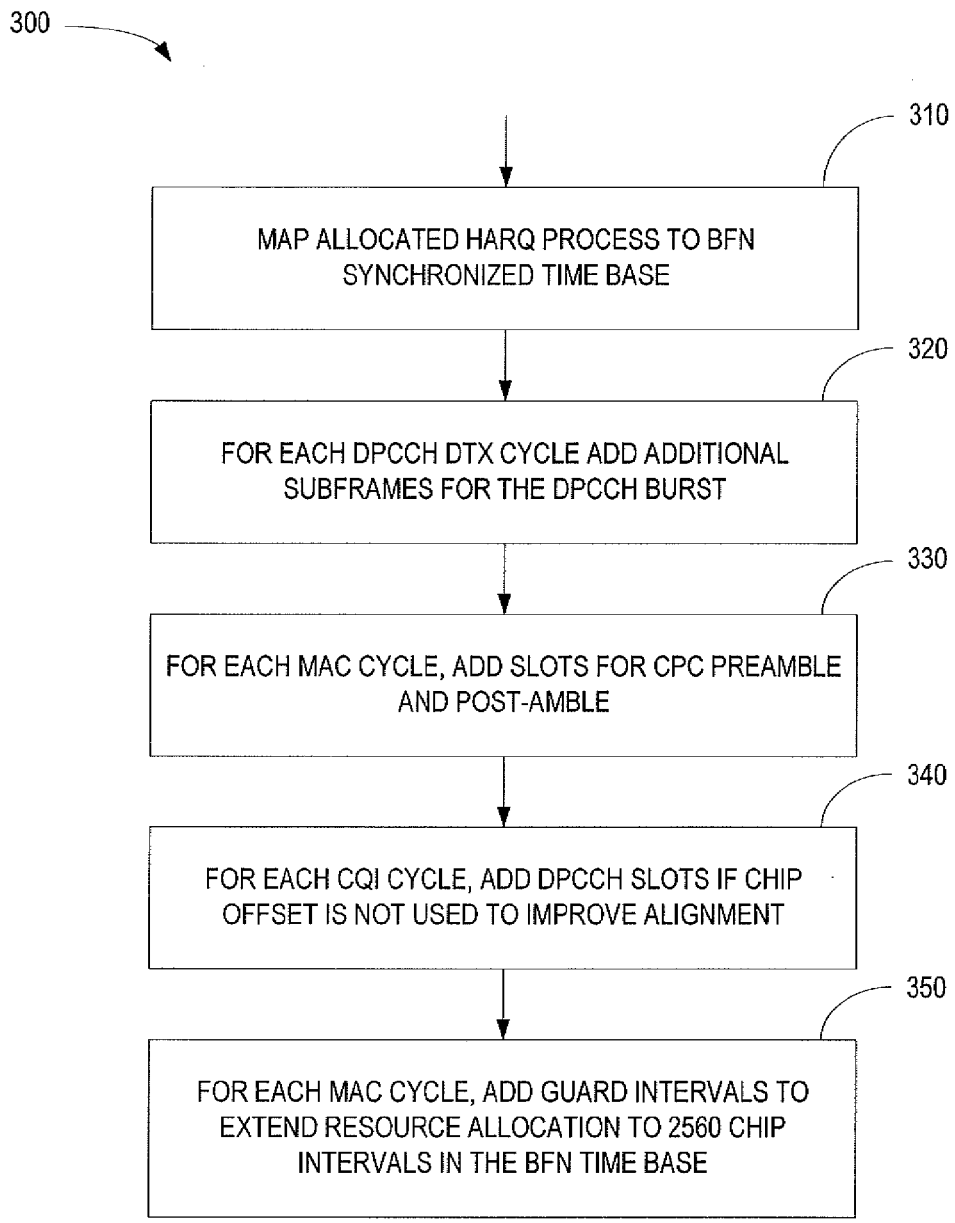
FIG. 4 illustrates an exemplary procedure implemented by a base station for determining a RAKE resource allocation.

FIG. 4 illustrates an exemplary procedure 300 performed by the uplink scheduler 44 at the base station 30 to determine the amount of RAKE resources to be allocated. In general, the uplink scheduler 44 determines a time window for uplink transmissions based on the allocated HARQ process and uplink burst cycles. RAKE resources corresponding to the determined time window are then allocated. More particularly, the uplink scheduler 44 maps the allocated HARQ process selected by the RRM 42 to a Basic frame number (BFN) time base (block 310). More specifically, the uplink scheduler 44 determines the basic MAC cycle allocation using the T-CELL, CHIP OFFSET, and FRAME OFFSET parameters, the constant $T_0$=1024 chips, and the measured propagation delay. For each DPCCH DTX cycle, additional subframes are added to the basic MAC allocation for the DPCCH burst (block 320). For every MAC DTX cycle, CPC preamble and post-amble slots are added (block 330). If the CHIP OFFSET information element is not used to align the CQI feedback cycle, uplink scheduler 44 may add additional DPCCH slots before or after the CQI transmission (block 340). Finally, the uplink scheduler 44 adds guard intervals as needed to extend the RAKE resource allocation to 2560 chip intervals in the BFN time base (block 350).

If sufficient RAKE resources are available, the uplink scheduler 44 assigns a scheduling grant for the allocated HARQ process and sends the scheduling grant to the mobile terminal over the E-AGCH so that it takes effect exactly at the allocated HARQ process. This action will reset the timer for periodic SI reporting. The grant is chosen to map the scheduled data, e.g., 354 bits. If the mobile terminal requests a higher rate, through the Happy Bit, the uplink scheduler 44 re-evaluates the air interface load and RAKE resource allocation, and may allocate a higher rate and/or more HARQ processes for scheduled data. The RAKE resource 34 continuously monitors the data activity of each mobile terminal and sends this information to the uplink scheduler 44.

When the radio bearer is reconfigured, the RRA 40 takes the same actions as at radio bearer setup. If a RAKE resource allocation already exists, RAKE resources that are not needed are de-allocated by the uplink scheduler 44.

Figure 5:
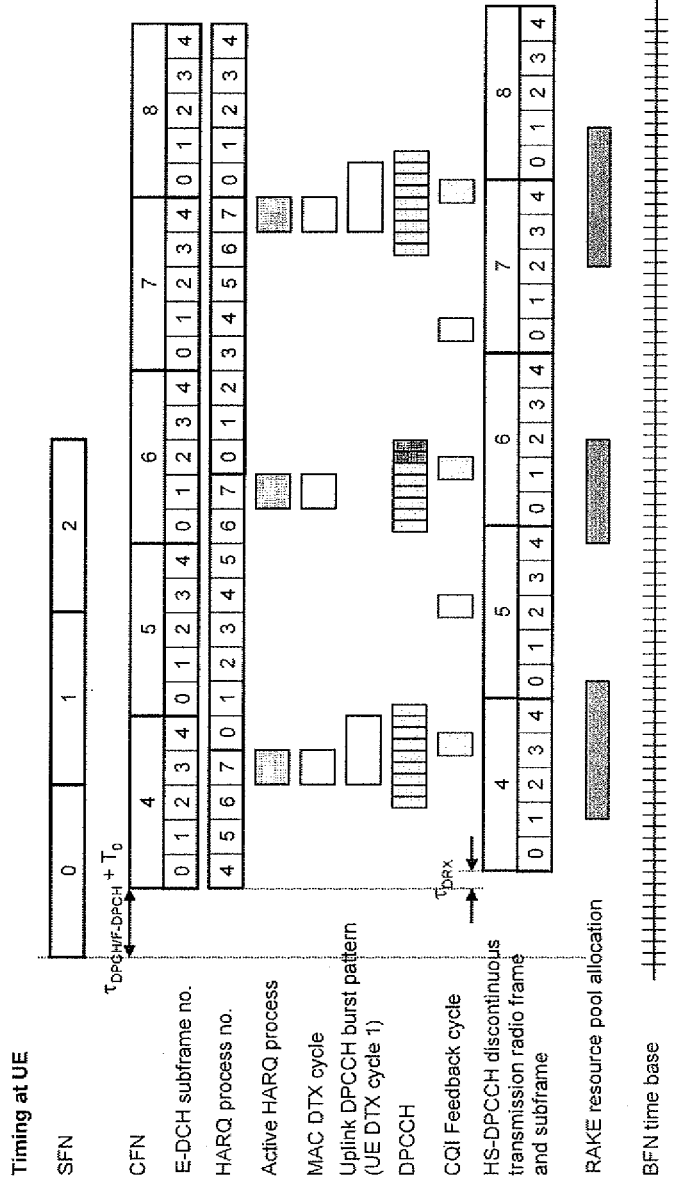
FIG. 5 is a timing diagram showing an exemplary RAKE resource allocation as herein described.

FIG. 5 is a timing diagram showing the alignment of the DPCCH DTX burst cycle and MAC DTX burst cycle with the HARQ process. This example assumes that the FRAME OFFSET equals 4 and that the HARQ process equals 7. As shown in FIG. 5, the timing of uplink transmissions is largely contained within predictable time windows, thus allowing multiple mobile terminals to the multiplexed on the same RAKE resources.

HS-DPCCH ACK transmissions do not generally have a cyclic nature and therefore a special RAKE resource allocation is needed for mobile terminals receiving downlink data. Therefore, the uplink scheduler 44 allots a part of each RAKE resource pool 32 to be reserved for HS-DPCCH transmissions. The HS-DPCCH pool is common for all mobile terminals in the RAKE resource pool 32. Preferably, it is only used for ACK transmissions or CQI transmissions taking place in the same subframe as ACK transmissions. Therefore, the RNC 20 configures a CPC parameter in order to restrict CQI transmissions outside of RAKE resource allocations, as shown in Table 7.

TABLE 7

| CQI DTX Timer | | |
|---|---|---|
| Parameter | Rule | Example |
| CQI DTX Timer | 0 subframes | 0 |

In one embodiment, the downlink scheduler 46 sends a signal to the uplink scheduler 44 in every subframe containing a list of mobile terminals that are being scheduled in the upcoming HSDPA subframe. The uplink scheduler 44 uses this list to allocate RAKE resources in the HS-DPCCH pool. The allocation has zero data rate and the extent is given as the HS-DPCCH subframe corresponding to the HS-PDSCH subframe plus DPCCH slots before and after the ACK/CQI transmission. The allocation may partly overlap with an existing allocation for the same mobile terminal in which case the existing allocation is extended.

In order to limit the size of the HS-DPCCH pool, the uplink scheduler 44 performs congestion handling as follows:

If at an allocation attempt the HS-DPCCH resource pool 32 is exhausted, the uplink scheduler 44 temporarily disables allocations in the RAKE resource pool 32 for a number of mobile terminals.

The set of disabled mobile terminals is selected based on reported data activity in ascending order (e.g., inactive mobile terminals are disabled first).

The RAKE resource 34 does not process mobile terminals as long as they are disabled. This means a small but controlled probability of SRB and synchronization loss as well as power control error.

In any case the HS-DPCCH pool does not need to handle more than 4 ACK transmissions per cell, as that is the HSDPA limitation.

The present invention enables multiple mobile terminals to be multiplexed on the same RAKE resources. Thus, the channel element (CE) cost of a mobile terminal can be lowered below 1. In a typical case, the RRA 40 can multiplex 288 mobile terminals over 128 RAKE resources. The CE cost is thus about 0.45 per mobile terminal. The number of mobile terminals at 20 kbps can be increased by a factor of 2.25. This is a substantial increase at no additional hardware cost. In advanced cases, where mobile terminals can be tightly time aligned to within 67 μs, the RRA 40 can multiplex even more mobile terminals and the CE cost can be lowered to 0.3. The invention does not require changes to any existing standards to be implemented and can be used with 3 GPP Release 7 capable mobile terminals.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of allocating receiver resources at a base station to receive uplink transmissions from a wireless terminal operating in a discontinuous transmission mode, said method comprising:
   selecting an acknowledgement process for the wireless terminal for uplink transmissions;
   determining control parameters for the discontinuous transmission mode to align an uplink burst cycle for transmissions on a dedicated control channel with the selected acknowledgement process so that the uplink burst cycle overlaps in time with the selected acknowledgement process; and
   allocating receiver resources to the wireless terminal based on the selected acknowledgement process and uplink burst cycle.

2. The method of claim 1 for a Wideband Code Division Multiple Access system wherein the dedicated control channel comprises a Dedicated Physical Control Channel.

3. The method of claim 1 for a Wideband Code Division Multiple Access system wherein the dedicated control channel comprises an Enhanced Dedicated Physical Control Channel.

4. The method of claim 1 further comprising determining control parameters to align a channel quality feedback cycle with the uplink burst cycle.

5. The method of claim 1 further comprising inhibiting multiplexing of scheduled and non-scheduled data in the same subframe.

6. The method of claim 1 further comprising setting a maximum size for packet data units used to transmit non-scheduled data.

7. The method of claim 1 further comprising setting an inactivity timer and a periodicity for transmission of scheduling information to minimize transmissions outside of the allocated acknowledgement process.

8. The method of claim 1 wherein allocating receiver resources to the wireless terminal comprises:
   determining a time window for an uplink burst based on the selected acknowledgement process and uplink burst cycle; and
   allocating available receiver resources in the time window to the wireless terminal.

9. The method of claim 8 wherein determining the time window comprises mapping the allocated acknowledgement process to a predetermined time base to obtain an initial allocation, and adding one or more subframes to the initial allocation for uplink bursts on the dedicated control channel.

10. The method of claim 9 wherein determining the time window further comprises adding one or more preamble slots and one or more post-amble slots to the allocation.

11. The method of claim 10 wherein determining the time window further comprises adding a guard interval to extend the allocation to a predetermined time interval in the time base.

12. The method of claim 1 further comprising allocating reserved receiver resources for receipt of acknowledgement messages from wireless terminals acknowledging downlink transmissions.

13. A system for allocating receiver resources at a base station to receive uplink transmissions from a wireless terminal operating in a discontinuous transmission mode, said system comprising:
   a radio resource manager to allocate radio resource to a wireless terminal for uplink transmissions, said radio resource manager configured to:
   select an acknowledgement process for the wireless terminal for uplink transmissions; and
   determine control parameters for the discontinuous transmission mode to align an uplink burst cycle for transmissions on a dedicated control channel with the selected acknowledgement process so that the uplink burst cycle overlaps in time with the selected acknowledgement process; and
   a scheduler for scheduling uplink transmissions, said scheduler configured to allocate receiver resources to the wireless terminal based on the selected acknowledgement process and uplink burst cycle.

14. The system of claim 13 for a Wideband Code Division Multiple Access system wherein the dedicated control channel comprises a Dedicated Physical Control Channel.

15. The system of claim 13 for a Wideband Code Division Multiple Access system wherein the dedicated control channel comprises a Enhanced Dedicated Physical Control Channel.

16. The system of claim 13 wherein the radio resource manager is further configured to determine control parameters to align a channel quality feedback cycle with the uplink burst cycle.

17. The system of claim 13 wherein the radio resource manager is further configured to inhibit multiplexing of scheduled and non-scheduled data in the same subframe.

18. The system of claim 13 wherein the radio resource manager is further configured to set a maximum size for packet data units used to transmit non-scheduled data.

19. The system of claim 13 wherein the radio resource manager is further configured to set an inactivity timer and a periodicity for transmission of scheduling information to minimize transmissions of scheduling information outside of the allocated acknowledgement process.

20. The system of claim 13 wherein the scheduler allocates receiver resources to the wireless terminal by:
   determining a time window for an uplink burst based on the selected acknowledgement process and uplink burst cycle; and
   allocating available receiver resources in the time window to the wireless terminal.

21. The system of claim 20 wherein the scheduler determines the time window by mapping the allocated acknowledgement process to a predetermined time base to obtain an initial allocation, and adding one or more subframes to the initial allocation for uplink bursts on the dedicated control channel.

22. The system of claim 21 wherein the scheduler is further configured to add one or more preamble slots and one or more post-amble slots to the allocation.

23. The system of claim 22 wherein the scheduler is further configured to add a guard interval to extend the allocated receiver resource to a predetermined time interval.

24. The system of claim 13 wherein the scheduler is further configured to allocate reserved receiver resources for receipt of acknowledgement messages from wireless terminals acknowledging downlink transmissions.

* * * * *